(12) United States Patent
Chenebault et al.

(10) Patent No.: US 6,181,275 B1
(45) Date of Patent: Jan. 30, 2001

(54) POSITIONING BY COMPUTING PSEUDO-SPEEDS IN A SATELLITE NAVIGATION SYSTEM

(75) Inventors: Jean Chenebault, Touch; Bruno Lobert, Castanet; Stéphane Journo, Toulouse, all of (FR)

(73) Assignee: Alcatel, Paris (FR)

( * ) Notice: Under 35 U.S.C. 154(b), the term of this patent shall be extended for 0 days.

(21) Appl. No.: 09/320,656

(22) Filed: May 27, 1999

(30) Foreign Application Priority Data

May 28, 1998 (FR) .................................................. 98 06767

(51) Int. Cl.$^7$ .................................................... H04B 7/185
(52) U.S. Cl. ................................ 342/357.05; 342/357.16; 342/357.01
(58) Field of Search ..................... 342/357.01, 357.05, 342/357.16

(56) References Cited

U.S. PATENT DOCUMENTS

| | | | | |
|---|---|---|---|---|
| 5,331,329 | * | 7/1994 | Volkov et al. ........................ | 342/357 |
| 5,416,712 | | 5/1995 | Geier et al. . | |
| 5,420,592 | | 5/1995 | Johnson . | |
| 5,740,048 | * | 4/1998 | Abel et al. ............................ | 364/443 |
| 5,870,056 | * | 2/1999 | Fowler ................................. | 342/424 |
| 5,883,595 | * | 3/1999 | Colley ................................. | 342/357 |
| 5,920,284 | * | 7/1999 | Victor ................................ | 342/357.01 |
| 6,014,404 | * | 1/2000 | Issler ................................ | 375/200 |

FOREIGN PATENT DOCUMENTS

| | | |
|---|---|---|
| 0 283 353 A1 | 9/1988 | (EP) . |
| 0 513 349 A1 | 11/1992 | (EP) . |
| 2 741 761 A1 | 5/1997 | (FR) . |
| WO 98/14797 | 4/1998 | (WO) . |

* cited by examiner

*Primary Examiner*—Thomas H. Tarcza
*Assistant Examiner*—Dao L. Phan
(74) *Attorney, Agent, or Firm*—Sughrue, Mion, Zinn, Macpeak & Seas, PLLC

(57) ABSTRACT

A method of locating a receiver in a navigation system comprising a constellation of satellites transmitting signals, includes the steps of:

measuring pseudo-distances between the receiver and the satellites from the signals received from the satellites, measuring pseudo-speeds between the receiver and the satellites from signals received from the satellites, and computing the position of the receiver from the combination of measured pseudo-distances and pseudo-speeds.

The position of the receiver is computed by minimizing the matrix of covariance of the measured pseudo-distances and pseudo-speeds. This provides an accurate position of the receiver in a simple manner, in particular for a constellation of satellites in low Earth orbit.

12 Claims, 1 Drawing Sheet

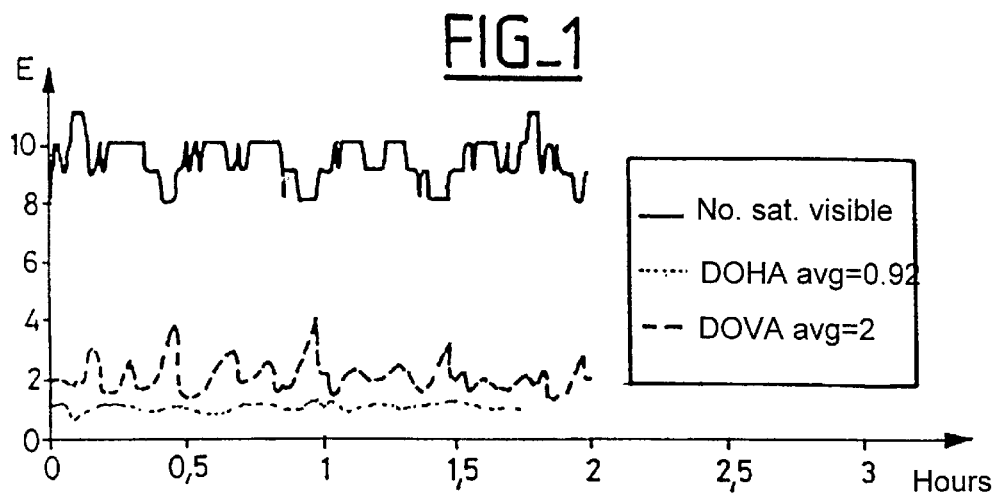
FIG_1
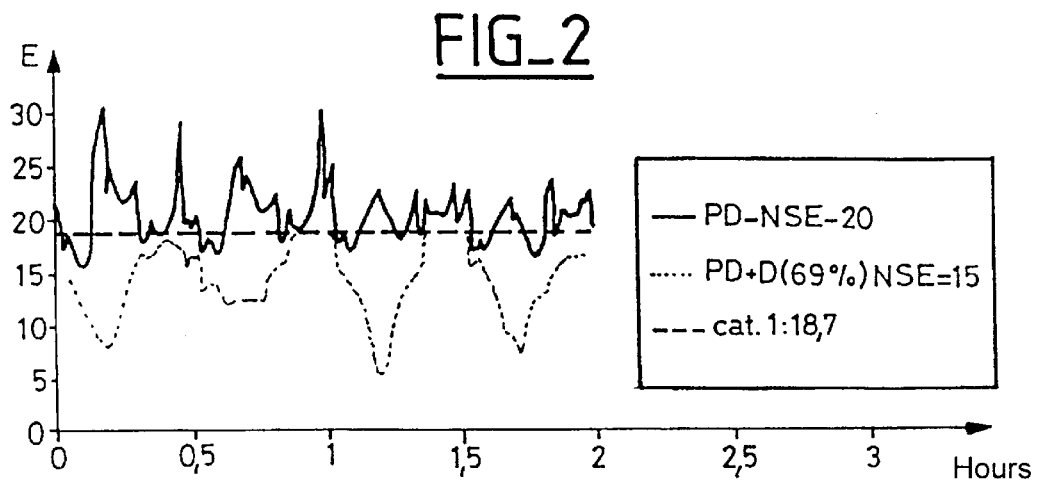
FIG_2
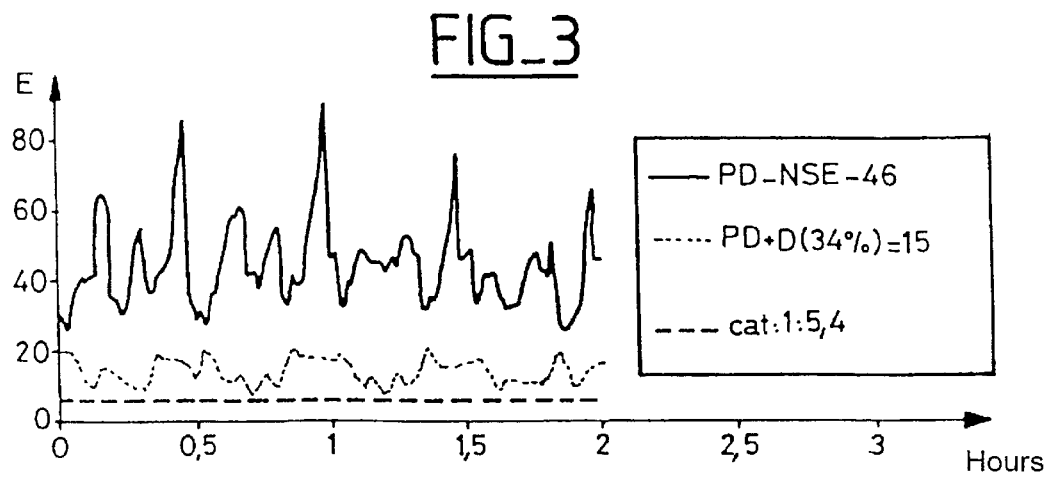
FIG_3

POSITIONING BY COMPUTING PSEUDO-SPEEDS IN A SATELLITE NAVIGATION SYSTEM

The present invention relates to a receiver for a navigation system comprising a constellation of satellites transmitting signals. The invention also concerns a method of locating a receiver in a navigation system comprising a constellation of satellites transmitting signals. It applies in particular to satellites in low Earth orbit.

BACKGROUND OF THE INVENTION

The invention concerns satellite navigation systems; these systems, using a constellation of satellites transmitting known signals, enable a receiver to compute its position within a geocentric frame of reference. These systems are used to navigate vehicles of all kinds, in particular ships and aircraft. The systems in use at present are the GPS and GLONASS systems, which comprise constellations of satellites at an altitude of 20 000 km. These systems are based on measuring pseudo-distances between the satellites and the receiver. A pseudo-distance is evaluated from the transmission time of a signal transmitted at a particular moment by the satellite and received by the receiver. For this purpose, the receiver measures the arrival time of the encoded signal transmitted by a satellite of the constellation and reads the time at which the signal was transmitted by the satellite in the received message. The receiver evaluates the transmission time by determining the time the message was received or by computing the phase of the signal.

Knowing the position of the satellites makes it possible to determine the position of the receiver by triangulation on the basis of the pseudo-distances. Existing prior art systems use four satellites to compute the position of the receiver; four measured pseudo-distances are thus used to determine the time and the position of the receiver station.

One of the main features of the above systems is that there is no limit on the number of users, in other words the system cannot be saturated; the satellites merely transmit and position is computed at each receiver. The receiver is therefore passive, operating in "listening" mode. This also implies that the pseudo-distances are measured on the one-way satellite-to-receiver path. Other details on the structure and operation of the above navigation systems can be found in the prior art documents cited below.

U.S. Pat. No. 5,420,592 describes the use of a GPS navigation system for positioning meteorological balloons; it proposes separating the GPS receiver into a mobile part carried by the balloon and a fixed part on the ground. A Kalman filter is used to predict the position of the balloon and enables positioning even with reduced visibility of the constellation of satellites. The system corrects the offsets induced by the Doppler effect in the signals from the satellites to enable correction of the signal from the satellite for fast computation of the pseudo-distance.

EP-A-0 460 862 describes a GPS type global positioning system receiver that can be implemented in a VLSI circuit. The receiver includes means for evaluating the pseudo-distance and the variation in the pseudo-distance in order to eliminate the Doppler effect from the carrier from the satellites.

U.S. Pat. No. 5,436,632 proposes to use the Doppler effect to compute corrections to be applied to the rate of variation of the pseudo-distances in a system for monitoring the integrity of the signals from a GPS type system.

U.S. Pat. No. 5,343,209 proposes to evaluate the Doppler shifts using an estimate of the speed of the receiver and the variations of the line of sight (LOS) of a GPS type positioning system. That evaluation produces an estimate of the phase of the carrier, the frequency of the carrier and the phase modulation of each of the received signals which is better than could be provided by each signal independently.

EP-A-0 518 146 describes a multi-point positioning system for a ship and towed buoys. That system uses a plurality of GPS receivers and Kalman filters to evaluate the quality of each position indication. It is again proposed to correct the Doppler shift for evaluating the pseudo-distances.

U.S. Pat. No. 5,594,453 describes a GPS receiver with a waiting mode to reduce power consumption; in order to enable rapid acquisition of the position on leaving the waiting mode, that document proposes to correct the influence of temperature on the clock frequency. The Doppler effect is used to compute the estimate of the frequency of the satellite in the new position, on leaving the waiting mode.

U.S. Pat. No. 5,557,284 proposes a system for detecting spoofing (the transmission of fake signals) in a global positioning system; it proposes to use the differences in the Doppler effect between two receivers on an aircraft or on the vehicle to detect fake signals.

In all the above documents, as in the prior art in general, the Doppler effect embodied in the signals from the satellites is seen as a drawback; it is proposed to correct the signals received to eliminate the Doppler effect or to allow for the Doppler effect in predicting the position of the receiver. None of the above documents proposes to use measurement of pseudo-speeds by the Doppler effect to improve the accuracy of the position determined. Also, all the above documents concern constellations of satellite in medium Earth orbit (MEO), such as the GPS or GLONASS systems.

OBJECTS AND SUMMARY OF THE INVENTION

In contrast, the invention proposes to use the pseudo-speed information provided by evaluating the doppler effect to compute the position of the receiver. It applies in particular to a constellation of satellites in low Earth orbit (LEO) for which the Doppler effect and the geometrical variability of the visible satellites are greater.

To be more precise, the invention proposes a receiver for a navigation system comprising a constellation of satellites transmitting signals, the receiver comprising means for measuring pseudo-distances between the receiver and the satellites from signals received from the satellites, means for measuring pseudo-speeds between the receiver and the satellites from signals received from the satellites, and means for computing the instantaneous position of the receiver from the combination of measured pseudo-distances and pseudo-speeds.

The pseudo-speed measuring means advantageously measure the pseudo-speeds on the basis of the Doppler shift of the signals received from the satellites.

In one embodiment, the system further comprises means for computing the speed of the receiver from the measured pseudo-speeds.

The computing means preferably compute the position or the speed of the receiver by a least squares method.

In one embodiment, the computing means compute the position or the speed of the receiver by minimizing the matrix of covariance of the measured pseudo-distances and pseudo-speeds.

The computing means preferably further comprise means for predicting the position of the receiver, for example using Kalman filters.

The constellation of satellites is advantageously a constellation of satellites in low Earth orbit.

The invention further proposes a method of locating a receiver in a navigation system comprising a constellation of satellites transmitting signals, comprising the steps of:

measuring pseudo-distances between the receiver and the satellites from the signals received from the satellites, measuring pseudo-speeds between the receiver and the satellites from signals received from the satellites, and computing the position of the receiver from the combination of measured pseudo-distances and pseudo-speeds.

The step of measuring the pseudo-speeds advantageously includes measuring the Doppler shift of the signals received from the satellites and computing the pseudo-speeds from the measured shift.

In one embodiment, the step of computing the position of the receiver also includes a step of computing the speed of the receiver from the measured pseudo-distances and pseudo-speeds.

The computation step preferably comprises computing the position or the speed of the receiver by a least squares method.

The computation step advantageously comprises computing the position or the speed of the receiver by minimizing the matrix of covariance of the measured pseudo-distances and pseudo-speeds.

The computation step can also comprise a step of predicting the position of the receiver, for example using Kalman filters.

The invention finally concerns the application of a method of the above kind to locating a receiver using signals from a constellation of satellites in low Earth orbit.

BRIEF DESCRIPTION OF THE DRAWINGS

Other features and advantages of the invention will become apparent on reading the following description of embodiments of the invention given by way of example and with reference to the accompanying drawings, in which:

FIG. 1 shows curves of dilution of horizontal and vertical accuracy in a system in accordance with the invention, FIG. 2 shows a curve of horizontal navigation error in a system of the invention, FIG. 3 shows a curve of vertical navigation error in a system of the invention.

MORE DETAILED DESCRIPTION

The invention proposes a global positioning system, or navigation system, using measured pseudo-distances and pseudo-speeds measured by means of the Doppler effect to compute the position of a receiver. Pseudo-speed is means the radial speed of the receiver relative to a satellite. In the remainder of the present description the invention is described with reference to a global positioning system using a constellation of satellites in low Earth orbit (LEO); it also applies to constellations of satellites at different altitudes.

In accordance with the invention, the satellites of the constellation are at a mean altitude of 1450 km; compared to existing systems, the lower altitude leads to greater geometrical variability. This variability is a priori less favorable for navigation applications in which four continuously visible satellites with a good geometrical configuration are conventionally used. The invention improves positioning performance even in a configuration of this kind.

A first embodiment of the invention proposes to use measured instantaneous pseudo-speeds to improve the positioning resolution. The equations relating the position to be estimated and the pseudo-distances to be measured can then be linearized. The equations linking the position to be estimated and the pseudo-speeds are also linearized. The measured pseudo-distances and pseudo-speeds can be combined in the same linear equation; this equation can be solved in the least squares sense to obtain the position of the system. In this way, the computing means use from the outset the measured pseudo-distances and pseudo-speeds; the measured pseudo-speeds are from the outset a variable of the instantaneous position computing function, on the same terms as the measured pseudo-distances, unlike in the prior art, in which pseudo-speeds are used only to correct the position previously computed using only the measured pseudo-speeds.

The following notation is used:

$S^k$: satellite number k of the constellation,

N: number of satellites visible in the constellation, $R^k$: pseudo-distance between the receiver and satellite $S^k$, c: speed of light, $\rho^k$: geometrical distance between the receiver and satellite $S^k$, b: skew of the receiver clock relative to the reference time of the global positioning system, $\epsilon^k$: measurement noise for the pseudo-distance $R^k$, $(X_1^{S_k} \, X_x^{S_k} \, X_3^{S_k})^t$: coordinates of satellite $S^k$, $(X_1, X_2, X_3)$: coordinates of receiver (point M), $(X_{1,0}, X_{2,0}, X_{3,0})$: initial coordinates of receiver (point $M_0$), $\delta X = (X_1 - X_{1,0} \, X_2 - X_{2,0} \, X_3 - X_{3,0})^t$: coordinates of the vector from point $M_0$ to point M, and $u_0^k$: unit vector from point $M_0$ to satellite $S^k$.

For each satellite, the receiver looks for the maximum correlation between the pseudo-random noise code PN of the signal transmitted by the satellite at a given time and the PN paradigm for the satellite stored in the receiver. A phase-locked loop can be used for this purpose, as is well-known per se. This search for the maximum correlation produces a time difference $\Delta\tau$ and is used to evaluate the pseudo-distance simply by multiplying by the speed of light; the pseudo-distance can be related to the distance between the receiver and the satellite by the equation:

$$R^k = c.\Delta\tau = \rho^k + c.b + \epsilon^k \qquad (1)$$

This equation can be linearized relative to the four unknowns consisting of the position and the skew of the clock, starting from the known initial position $M_0$ of the satellite; to the first order:

$$\delta R^k = R^k - R_0^k = \rho^k - \rho_0^k c \cdot b + \epsilon^k$$

$$\delta R^k = \left(\frac{\partial \rho^k}{\partial X_1} \frac{\partial \rho^k}{\partial X_2} \frac{\partial \rho^k}{\partial X_3}\right) \cdot (X_1 - X_{1,0} \, X_2 - X_{2,0} \, X_3 - X_{3,0})^t + c \cdot b + \varepsilon^k$$

$$\delta R^k = \left(\frac{\partial \rho^k}{\partial X_1} \frac{\partial \rho^k}{\partial X_2} \frac{\partial \rho^k}{\partial X_3}\right) \cdot \underline{\delta X}^t + c \cdot b + \varepsilon^k$$

Computing the partial derivatives yields:

$$\frac{\partial \rho^k}{\partial X_i} = \frac{X_i^{S_k} - X_i}{\rho^k}$$

whence:

$$\left( \frac{\partial \rho^k}{\partial X_1} \frac{\partial \rho^k}{\partial X_2} \frac{\partial \rho^k}{\partial X_3} \right) = -\underline{u_0^{k^t}}$$

Considering all the N visible satellites, and denoting by δR the vector made up of the measurements, differentially relative to the known position $M_0$ of the receiver:

$$\delta R = (\delta R^1 \ldots \delta R^N)^t,$$

$$A = \begin{bmatrix} -u_0^{1^t} & 1 \\ \vdots & \vdots \\ -u_0^{N^t} & 1 \end{bmatrix}$$

and Y, the vector of the unknowns, $$\underline{Y} = \begin{pmatrix} \delta X \\ c \cdot b \end{pmatrix}$$

we obtain $$\underline{\delta R} = A \cdot \underline{Y} + \begin{pmatrix} \varepsilon^1 \\ \vdots \\ \varepsilon^N \end{pmatrix}$$

A minimum of four visible satellites is used to determine four pseudo-distances and thereby to determine the three position unknowns and the clock skew unknown. The equation can be solved using a least squares method:

$$\hat{Y} = (A^t \cdot A)^{-1} \cdot A^t \cdot \delta R$$

However, the invention proposes not only to use this simple positioning method based on measuring the pseudo-distances, but also to measure the pseudo-speeds on the basis of the Doppler effect to determine the position of the receiver. Observing the Doppler effect yields the following equation:

$$-\frac{\Delta f}{f} = \frac{\dot{\rho}}{c} + \dot{b} + \eta'$$

or $$-\lambda \cdot \Delta f = -D = \dot{\rho} + c \cdot \dot{b} + \eta'$$

using the following notation:
- $\dot{\rho}$: true radial speed,
- $\dot{b}$: receiver clock drift,
- D: Doppler measurement converted to distance,
- $T_D$: Doppler measurement acquisition time,
- D': $D^* T_D$,
- η: residual noise of the Doppler measurement,
- $u^k$: unit vector from the receiver to satellite k,
- $V^{S_k}$: speed of satellite $S^k$, and
- V: speed of receiver.

The invention proposes to linearize the system by introducing an approximate position $M_0$ and an approximate speed $V_0$ of the receiver. Then, for a given satellite $S^k$:

$$-D^k = (V^{S_k} - V)^t \cdot u^k + c \cdot \dot{b} + \eta^k$$

$$-D^k = (\underline{V}^{S_k} - (\underline{V_0} + \underline{\delta V}))^t \cdot \left( \underline{u_0^k} + \left( \frac{\partial \underline{u^k}}{\partial \underline{X}} \right)^t \cdot \underline{\delta X} \right) + c \cdot \dot{b} + \eta^k$$

with $$\delta V = V - V_0$$

$$\left( \frac{\partial \underline{u^k}}{\partial \underline{X}} \right) = \left( \frac{\partial \underline{u^k}}{\partial X_1} \frac{\partial \underline{u^k}}{\partial X_2} \frac{\partial \underline{u^k}}{\partial X_3} \right)^t = \begin{pmatrix} \frac{\partial u_1^k}{\partial X_1} & \frac{\partial u_2^k}{\partial X_1} & \frac{\partial u_3^k}{\partial X_1} \\ \frac{\partial u_1^k}{\partial X_2} & \frac{\partial u_2^k}{\partial X_2} & \frac{\partial u_3^k}{\partial X_2} \\ \frac{\partial u_1^k}{\partial X_3} & \frac{\partial u_2^k}{\partial X_3} & \frac{\partial u_3^k}{\partial X_3} \end{pmatrix}$$

Now, $$\frac{\partial \underline{u^k}}{\partial X_i} = \frac{\partial}{\partial X_j} \left( \frac{MS^k}{\rho^k} \right) \bigg|_{M=M_0} = \frac{\partial}{\partial X_j} \left( \frac{X^{S_k} - X}{\rho^k} \right)$$

$$\frac{\partial u_j^k}{\partial X_i} = -\frac{\delta_{ij}}{\rho^k} - \frac{X_j^{S_k} - X_j}{(\rho^k)^2} \cdot \frac{\partial \rho^k}{\partial X_i} = -\frac{\delta_{ij}}{\rho^k} - \frac{X_j^{S_k} - X_j}{(\rho^k)^2} \cdot \frac{X_i - X_i^{S_k}}{\rho^k}$$

$$\frac{\partial u_j^k}{\partial X_i} = -\frac{\delta_{ij}}{\rho^k} + \frac{u_j^k \cdot u_i^k}{\rho^k}$$

whence:

$$\left( \frac{\partial \underline{u^k}}{\partial \underline{X}} \right) = \frac{1}{\rho^k} \cdot \left( \underline{u^k} \cdot \underline{u^{k^t}} - I_3 \right).$$

Expanding the above equation and neglecting the second order term $\delta V^t \cdot \delta X^t$:

$$\delta D^k = -\underline{u_0^{k^t}} \cdot \underline{\delta V} + (\underline{V}^{S_k} - \underline{V_0})^t \cdot \left( \frac{1}{\rho^k} \cdot \left( \underline{u^k} \cdot \underline{u^{k^t}} - I_3 \right) \right) \cdot \underline{\delta X} + c \cdot \dot{b} + \eta^k$$

For N visible satellites, the above equation becomes:

$$\begin{pmatrix} \delta D^1 \\ \vdots \\ \delta D^N \end{pmatrix} =$$

$$\begin{pmatrix} (\underline{V}^{S_1} - \underline{V_0})^t \cdot \left( \frac{1}{\rho^1} \cdot \left( \underline{u^1} \cdot \underline{u^{1^t}} - I_3 \right) \right) & -\underline{u_0^{1^t}} & 1 \\ \vdots & \vdots & \vdots \\ (\underline{V}^{S_N} - \underline{V_0})^t \cdot \left( \frac{1}{\rho^N} \cdot \left( \underline{u^N} \cdot \underline{u^{N^t}} - I_3 \right) \right) & -\underline{u_0^{N^t}} & 1 \end{pmatrix} \cdot \begin{pmatrix} \underline{\delta X} \\ \underline{\delta V} \\ c \cdot \dot{b} \end{pmatrix} + \begin{pmatrix} \eta^1 \\ \vdots \\ \eta^N \end{pmatrix}$$

In accordance with the invention, the radial speed of the mobile station can be neglected; this assumption is particularly acceptable for constellations in low Earth orbit, in which the radial speeds of the satellites are considerably higher than the probable speeds of the receiver.

The previous equation then becomes:

$$\delta D = \begin{pmatrix} \underline{V}^{S^t}_1 \cdot \frac{1}{\rho^1} \cdot (\underline{u}^1 \cdot \underline{u}^{1^t} - I_3) & -\underline{u}^{1^t}_0 & 1 \\ \vdots & \vdots & \vdots \\ \underline{V}^{S^t}_N \cdot \frac{1}{\rho^N} \cdot (\underline{u}^N \cdot \underline{u}^{N^t} - I_3) & -\underline{u}^{N^t}_0 & 1 \end{pmatrix} \cdot \begin{pmatrix} \delta X \\ \delta V \\ c \cdot \dot{b} \end{pmatrix} + \begin{pmatrix} \eta^1 \\ \vdots \\ \eta^N \end{pmatrix}$$

The measured pseudo-distances and pseudo-speeds are combined in the same linear equation:

$$\begin{pmatrix} \delta R \\ \delta D \end{pmatrix} = \begin{pmatrix} -\underline{u}^{1^t}_0 & & 0 & 1 & 0 \\ \vdots & & \vdots & \vdots & \vdots \\ -\underline{u}^{N^t}_0 & & 0 & 1 & 0 \\ \underline{V}^{S^t}_1 \cdot \frac{1}{\rho^1} \cdot (\underline{u}^1 \cdot \underline{u}^{1^t} - I_3) & -\underline{u}^{1^t}_0 & 0 & 1 \\ \vdots & & \vdots & \vdots & \vdots \\ \underline{V}^{S^t}_N \cdot \frac{1}{\rho^N} \cdot (\underline{u}^N \cdot \underline{u}^{N^t} - I_3) & -\underline{u}^{N^t}_0 & 0 & 1 \end{pmatrix} \cdot \begin{pmatrix} \delta X \\ \delta V \\ c \cdot b \\ c \cdot \dot{b} \end{pmatrix} + \begin{pmatrix} \varepsilon^1 \\ \vdots \\ \varepsilon^N \\ \eta^1 \\ \vdots \\ \eta^N \end{pmatrix}$$

For homogeneous unknowns, some terms can be multiplied by the pseudo-speed measurement acquisition time Td:

$$\begin{pmatrix} \delta R \\ \delta D \cdot T_D \end{pmatrix} =$$

$$\begin{pmatrix} -\underline{u}^{1^t}_0 & & 0 & 1 & 0 \\ \vdots & & \vdots & \vdots & \vdots \\ -\underline{u}^{N^t}_0 & & 0 & 1 & 0 \\ \underline{V}^{S^t}_1 \cdot T_D/\rho^1 \cdot (\underline{u}^1 \cdot \underline{u}^{1^t} - I_3) & -\underline{u}^{1^t}_0 & 0 & 1 \\ \vdots & & \vdots & \vdots & \vdots \\ \underline{V}^{S^t}_N \cdot T_D/\rho^N \cdot (\underline{u}^N \cdot \underline{u}^{N^t} - I_3) & -\underline{u}^{N^t}_0 & 0 & 1 \end{pmatrix} \cdot \begin{pmatrix} \delta X \\ \delta V \cdot T_D \\ c \cdot b \\ \lambda \cdot \dot{b} \end{pmatrix} + \begin{pmatrix} \varepsilon^1 \\ \vdots \\ \varepsilon^N \\ \eta^1 \\ \vdots \\ \eta^N \end{pmatrix}$$

An equation is obtained of the type Z=A.Y+ϵ with:

$$\underline{Y} = \begin{pmatrix} \delta X \\ \delta V \cdot T_D \\ c \cdot b \\ \lambda \cdot \dot{b} \end{pmatrix} \text{ and } \underline{Z} = \begin{pmatrix} \delta R \\ \delta D \cdot T_D \end{pmatrix}$$

The above equation contains 8 unknowns for 2N measurements and can be solved using four visible satellites. Clearly if more than four satellites are visible some can be used to measure the pseudo-distances and others to measure the pseudo-speeds; any combination of satellites enabling a sufficient number of measurements to be obtained to solve the equation can be used.

The equation is advantageously solved in the least squares sense; in accordance with the invention, to assure an optimum solution, a solution is looked for that minimizes the matrix of covariance of the measured pseudo-speeds and pseudo-distances. Using the notation:

Σ=cov(Z)

for the matrix of covariance of the measurements, the aim is to minimize $$\min \|Z - A \cdot \hat{Y}\|_{\Sigma^{-1}}$$

The solution is given by $$\hat{Y} = (A^t \cdot \Sigma^{-1} \cdot A)^{-1} \cdot A^t \cdot \Sigma^{-1} \cdot Z$$

In this way, the invention does not propose merely juxtaposing the calculated pseudo-speeds and pseudo-distances, but combined use of the measured pseudo-distances and pseudo-speeds to compute the position of the receiver.

The invention determines the position of the receiver more accurately. The accuracy of the location can be evaluated by computing the covariance of the solution obtained, which gives an indication of the position, speed and time. The covariance is written:

Cov($\hat{Y}$)=(A$^t$·Σ$^{-1}$·A)$^{-1}$

The following tables show the results of pseudo-distance measurements for a navigation system using a constellation of satellites in low Earth orbit and a receiver onboard an aircraft. The tables show the accuracy computed using the covariance of the solution by means of the above equation. The first column gives the results of positioning using only the measured pseudo-distances, as in the prior art systems. The second column gives the results of positioning in accordance with the invention. The respective modes are mode 0: simple or absolute mode, single frequency, no differential correction,
mode 1: local differential mode,
mode 2: dual frequency mode, and
mode 3: enhanced local differential mode.

Mode 3 uses a narrow correlator in the receiver; the code is filtered by the phase in the receiver of the differential station; differential correction of the pseudo-distances is also used with advantage; differential correction of the pseudo-speeds could be used, but was not used to obtain the results set out in the tables.

| | Horizontal navigation error (meters) | |
|---|---|---|
| Mode | pseudo-distance | invention |
| mode 0 | 20 | 15 |
| mode 1 | 4.5 | 4 |
| mode 2 | 18 | 11 |
| mode 3 | 1.7 | 1.6 |

The navigation sensor error (NSE) for category 1 systems is 18.7 m; the invention achieves this limit for all modes.

| | Vertical navigation error (meters) | |
|---|---|---|
| Mode | pseudo-distance | invention |
| mode 0 | 46 | 15 |
| mode 1 | 11 | 7.3 |
| mode 2 | 41 | 9.7 |
| mode 3 | 4.2 | 3.8 |

The NSE for category 1 systems is 5.4 m; the invention achieves this limit at least for mode 3.

In all cases, the invention significantly improves on the results of conventional positioning obtained by measuring only the pseudo-distances.

These results also appear in FIGS. 1 to 3, which are graphical representations of simulated evolution in time of the NSE for mode 0 and for a constellation of satellites in low Earth orbit. FIG. 1 has no dimensions on the ordinate axis and hours on the abscissa axis. It shows in continuous line the number of satellites visible, in long dashed line the dilution of horizontal accuracy and in short dashed line the dilution of vertical accuracy. The average dilution of horizontal accuracy is 0.92 and the average dilution of vertical accuracy is 2.

FIG. 2 shows the values of the navigation error for the same simulations as the tables. The ordinate axes are graduated in meters and the abscissa axes are again in hours. The horizontal chain-dotted line at the value 18.7 meters corresponds to the limit of category 1. The continuous line shows the navigation error in a conventional system in which the position is evaluated using only the computed pseudo-distances; as indicated in the above table, the average navigation error is in the order of 20 meters and is above the limit for category 1. The dashed line shows the navigation error in the receiver of the invention, which has an average value of 15 meters. Note further that the navigation error in accordance with the invention has a relatively small excursion and remains at all times below the limit threshold for category 1.

FIG. 3 shows using the same notation the corresponding results for the vertical error. The limit for category 1 is 5.4 meters and the average values in accordance with the standard method and for the invention are respectively 46 meters and 15 meters.

The figures show that the invention achieves improved results, not only in terms of average value but at all times.

A different embodiment of the invention also uses a dynamic model to determine the coordinates of the receiver from the measured position and speeds. To this end Kalman filtering can be used to predict the position of the receiver.

The Kalman filter used operates with a state vector $E_n$:

$$E_n = (X, V, A, u)^t$$

where X is the position of the receiver, V its speed, A the acceleration and u the noise at time n. $P_0$ denotes the matrix of covariance of $E_0$ at the initial time, or in the position $M_0$, with the speed $V_0$ and the acceleration $A_0$, and $P_n$ denotes the matrix of covariance of $E_n$.

The equation of the dynamic model is as follows:

$$E_{n+1} = F \cdot E_n + w_1$$

in which n is the index of the time, $w_1$ is an error term of the model, dependent on the noise, which is assumed to be Gaussian white noise, and F is the propagation matrix associated with the Kalman filter.

Q denotes the covariance of $w_1$.

$$Q = \text{cov}(w_1) = \begin{pmatrix} 0_3 & & & \\ & 0_3 & & \\ & & 0_3 & \\ & & & \sigma^2 \cdot I_3 \end{pmatrix}$$

In the above expression, $\sigma$ is the innovation factor, which characterizes the confidence placed in the propagation model, and which enables adjustment of the filter.

The propagation matrix F is written:

$$F = \begin{pmatrix} I_3 & \Delta t \cdot I_3 & \frac{\Delta t^2}{2} \cdot I_3 & \frac{\Delta t^3}{6} \cdot I_3 \\ & I_3 & \Delta t \cdot I_3 & \frac{\Delta t^2}{2} \cdot I_3 \\ & & I_3 & \Delta t \cdot I_3 \\ & & & 0_3 \end{pmatrix}$$

The measurement equation is written $$Y = H \cdot E + w_2$$

in which, as in the previous embodiments, Y is the matrix of the unknowns, E is the state vector estimated by the Kalman filter, H is the measurement matrix defined below and $w_2$ is the measurement noise, i.e. the positioning error. The noise matrix R, which is equal to the covariance of the measurement noise, is given by the positioning step described in the previous embodiment. Accordingly, in this embodiment as in the previous one, the matrix of covariance of the positions and speeds is used to compute the approximate position for entry into the dynamic model.

At each measurement time, the Kalman filter process is made up of two steps, a prediction step—from En to an estimated value $E_{n+1}$—and a step of correcting the estimated value. The following filter can be used:

$E_{n+1} = F \cdot E_n$ and
$P_{n+1} = F \cdot P_n \cdot F^t + Q$
for the prediction step, and
$K = P_{n+1} \cdot H^t \cdot \Sigma^{-1}$, which represents the Kalman gain,
$\Sigma = R + H \cdot P \cdot H^t$, H being defined below,
$E_{n+1} = E_{n+1} + K \cdot (Y_{n+1} - H \cdot E_{n+1})$
$P_{n+1} = (I - K \cdot H) \cdot P_{n+1}$
for the prediction correction step.

$P_0$ is written $$P_0 = \begin{pmatrix} R_0 & & & \\ & R_v & & \\ & & R_a & \\ & & & 0_3 \end{pmatrix}$$

$R_0$ is the matrix of covariance of the measured positions and speeds, and $R_a$ is chosen as $$R_a = \begin{pmatrix} 0.1^2 & & \\ & 0.1^2 & \\ & & 0.1^2 \end{pmatrix} \text{ in, } (m/s^2)^2.$$

The computed position and speed and an approximate value of the acceleration can be taken for the initial state $E_0$. The measurement matrix H is written $$H = \begin{pmatrix} I_3 & 0_3 & 0_3 & 0_3 \\ 0_3 & I_3 & 0_3 & 0_3 \end{pmatrix}$$

Thus the pseudo-distances and pseudo-speeds are measured continuously and the position and the approximate speed computed afterwards from the measured values. An iterative least squares method can be used as in the first embodiment, minimizing errors.

The approximate position and speed are used as input to the dynamic model to obtain a prediction of the state vector of the receiver. This prediction is corrected to provide an estimate of the speed and position of the receiver.

In this case the invention further improves positioning accuracy, as shown by the following tables, still in the case of a constellation of satellites in low Earth orbit. The notation is the same as for the previous embodiment; for positioning by calculating only the pseudo-distances, the results are also indicated with or without Kalman filtering; for positioning in accordance with the invention, the results with or without use of the dynamic model are also indicated.

| | Horizontal navigation error (meters) | | | |
|---|---|---|---|---|
| | pseudo-distance | | invention | |
| Mode | without filtering | with filtering | without filtering | with filtering |
| mode 0 | 24 | 24 | 9.8 | 2.8 |
| mode 1 | 4.4 | 3.2 | 3.8 | 1.9 |
| mode 3 | 1.8 | 1.4 | 1.7 | 1.3 |

| | Vertical navigation error (meters) | | | |
|---|---|---|---|---|
| | pseudo-distance | | invention | |
| Mode | without filtering | with filtering | without filtering | with filtering |
| mode 0 | 32 | 32 | 11.4 | 4.2 |
| mode 1 | 12 | 7.4 | 7.8 | 5.6 |
| mode 3 | 4.6 | 3.6 | 4 | 2.4 |

Once again the tables show that the invention produces more accurate results than the prior art using only the pseudo-distances. The embodiment of the invention using a dynamic model to predict the position of the receiver provides further improved results. Compared to the limits of category 1 of the navigation systems, the invention achieves category 1 for horizontal error in modes 0, 1 and 3; the second embodiment achieves this category for the vertical error, very easily for mode 3, and marginally for modes 0 and 1.

The second embodiment therefore provides a more accurate position, still using the measured pseudo-distances and pseudo-speeds simultaneously to determine the position.

Of course, the present invention is not limited to the examples and embodiments described and shown, but is open to many variations that will suggest themselves to the skilled person. Thus different satellites could be used for the various measurements, if more than four satellites are visible. It is also clear that the invention is not limited to the preferred embodiment of a constellation in low Earth orbit, even though it is for this type of orbit that the pseudo-speed variations measured by the Doppler shift are greater.

What is claimed is:

1. A receiver for a navigation system comprising a constellation of satellites transmitting signals, the receiver comprising:
   means for measuring pseudo-distances between the receiver and the satellites from signals received from the satellites;
   means for measuring pseudo-speeds between the receiver and the satellites from signals received from the satellites; and
   means for computing an instantaneous position of the receiver from the combination of measured pseudo-distances and pseudo-speeds, wherein the computing of the instantaneous position assumes that a radial speed of the receiver can be neglected, and wherein the constellation of satellites is in low Earth orbit.

2. A receiver according to claim 1, wherein the pseudo-speed measuring means measure the pseudo-speeds from the Doppler shift of the signals received from the satellites.

3. A system according to claim 1, further comprising means for computing the speed of the receiver from the measured pseudo-speeds.

4. A receiver according to claim 1, wherein the computing means compute the position or the speed of the receiver by a least squares method.

5. A receiver for a navigation system that includes a constellation of satellites transmitting signals, comprising:
   means for measuring pseudo-distances between the receiver and the satellites from signals received from the satellites;
   means for measuring pseudo-speeds between the receiver and the satellites from signals received from the satellites; and
   means for computing the instantaneous position of the receiver from the combination of measured pseudo-distances and pseudo-speeds, wherein the means for computing compute the position or the speed of the receiver by minimizing the matrix of covariance of the measured pseudo-distances and pseudo-speeds.

6. A receiver according to claim 1, wherein the computing means further comprise means for predicting the position of the receiver, for example using Kalman filters.

7. A method of locating a receiver in a navigation system comprising a constellation of satellites transmitting signals, comprising the steps of:
   measuring pseudo-distances between the receiver and the satellites from received ones of the signals from the satellites,
   measuring pseudo-speeds between the receiver and the satellites from the signals received from the satellites, and
   computing an instantaneous position of the receiver from a combination of the measured pseudo-distances and the pseudo-speeds, wherein the computing of the instantaneous position assumes that a radial speed of the receiver can be neglected, and wherein the constellation of satellites is in low Earth orbit.

8. A method according to claim 7, wherein the step of measuring the pseudo-speeds comprises measuring the Doppler shift of the signals received from the satellites and computing the pseudo-speeds from the measured shift.

9. A method according to claim 7, wherein the step of computing the position of the receiver also includes a step of computing the speed of the receiver from the measured pseudo-distances and pseudo-speeds.

10. A method according to claim 7, wherein the computation step comprises computing the position or speed of the receiver by a least squares method.

11. A method of locating a receiver in a navigation system having a constellation of satellites transmitting signals, comprising the steps of:
   measuring pseudo-distances between the receiver and the satellites from the signals received from the satellites;
   measuring pseudo-speeds between the receiver and the satellites from signals received from the satellites; and
   computing the position of the receiver from a combination of measured pseudo-distances and pseudo-speeds, wherein the computing step comprises computing the position or speed of the receiver by minimizing the matrix of covariance of the measured pseudo-distances and pseudo-speeds.

12. A method according to claim 7, wherein the computing step comprises a step of predicting the position of the receiver, for example using Kalman filters.

* * * * *